United States Patent [19]
Chung et al.

[11] Patent Number: 6,096,849
[45] Date of Patent: Aug. 1, 2000

[54] LINEAR COPOLYMERS OF ALPHA-OLEFINS AND DIVINYLBENZENE HAVING NARROW MOLECULAR WEIGHT AND COMPOSITION DISTRIBUTIONS AND PROCESS FOR PREPARING SAME

[75] Inventors: Tze-Chiang Chung; Jinyong Dong, both of State College, Pa.

[73] Assignee: The Penn State Research Foundation, University Park, Pa.

[21] Appl. No.: 09/359,345

[22] Filed: Jul. 21, 1999

[51] Int. Cl.[7] .......................... C08F 236/20; C08F 4/643
[52] U.S. Cl. ..................... 526/336; 526/126; 526/127; 526/134; 526/160; 526/170; 526/943; 526/348.2; 525/105; 525/250; 525/259; 525/285
[58] Field of Search ................ 526/336, 348.2, 526/126, 127, 134, 160, 170, 943; 525/332.2, 105, 250, 259, 285

[56] References Cited

U.S. PATENT DOCUMENTS

| | | | |
|---|---|---|---|
| 3,265,765 | 8/1966 | Holden et al. | 260/876 |
| 3,658,770 | 4/1972 | Longi et al. | 260/79.5 P |
| 3,887,650 | 6/1975 | Agouri et al. | 260/878 B |
| 4,174,358 | 11/1979 | Epstein | 525/183 |
| 4,299,931 | 11/1981 | Coran et al. | 525/95 |
| 4,340,705 | 7/1982 | Lai et al. | 526/139 |
| 4,366,296 | 12/1982 | Kitagawa et al. | 526/77 |
| 4,530,914 | 7/1985 | Ewen et al. | 501/113 |
| 4,542,199 | 9/1985 | Kaminsky et al. | 526/160 |
| 4,551,503 | 11/1985 | Lai et al. | 525/332.1 |
| 4,665,047 | 5/1987 | Slaugh et al. | 502/108 |
| 4,680,318 | 7/1987 | Fujii et al. | 521/95 |
| 4,734,472 | 3/1988 | Chung | 526/239 |
| 4,751,276 | 6/1988 | Chung | 526/158 |
| 4,752,597 | 6/1988 | Turner | 502/104 |
| 4,812,529 | 3/1989 | Chung | 525/326.1 |
| 4,877,846 | 10/1989 | Chung | 525/369 |
| 4,946,899 | 8/1990 | Kennedy et al. | 525/244 |
| 5,026,798 | 6/1991 | Canich | 526/127 |

(List continued on next page.)

FOREIGN PATENT DOCUMENTS

| | | |
|---|---|---|
| 0315431 A2 | 11/1988 | European Pat. Off. . |
| 62-241907 | 10/1987 | Japan . |
| 03255114 | 11/1991 | Japan . |
| 05017539 | 1/1993 | Japan . |
| 05194665 | 8/1993 | Japan . |
| 05194666 | 8/1993 | Japan . |
| 08003231 | 1/1996 | Japan . |
| 08003232 | 1/1996 | Japan . |

OTHER PUBLICATIONS

Chung, et al, *Macromolecules*, vol. 26, No. 14, pp. 3467–3471 (1993).
Cohen, et al, *Macromolecules*, vol. 15, pp. 370–375 (1982).
Doi, et al, *Makromol. Chem.*, vol. 186, pp. 11–15 (1985).
Yasuda, et al, *Macromolecules*, vol. 25, pp. 5115–5116 (1992).
Drzewinski, et al, *J. Polym. Sci., Part A: Polym. Chem.*, vol. 24, pp. 2457–2466 (1986).
Mulhaupt, et al, *Makromol. Chem.m Macromol. Symp.*, vol. 48/49, pp. 317–332 (1991).
Doi, et al, *Advanced Polym. Sci.*, vol. 73/74, pp. 201–248 (1989).
Lee, et al, *Polymer*, vol. 35, No. 14, pp. 2980–2984 (1994).
Chung, et al, *Macromolecules*, vol. 27, No. 6, pp. 1313–1319 (1994).
Chung, et al, *J. Polym. Sci.: Part A: Polym. Chem.*, vol. 36, pp. 1017–1029 (1998).
Lu, et al, *Macromolecules*, vol. 31, No. 7, pp. 2028–2034 (1998).
Marathe, et al, *Macromolecules*, vol. 27, pp. 1083–1086 (1994).
Kitagawa, et al, *Polymer Bulletin*, vol. 10, pp. 109–113 (1983).
Ver Strate, et al, *Encyclopedia of Polym. Sci. and Eng.*, vol. 6, pp. 522–563 (1986).
Bruzzone, et al, *Makromol. Chem.*, vol. 179, pp. 2173–2185 (1978).
Cucinella, et al, *European Polymer Journal*, vol. 12, pp. 65–70 (1976).

(List continued on next page.)

*Primary Examiner*—Fred Teskin
*Attorney, Agent, or Firm*—Thomas J. Monahan

[57] ABSTRACT

The invention relates to linear copolymers containing alpha-olefin and divinylbenzene comonomer units and to a process for preparing the copolymers, the copolymers having a mole ratio of unsaturation/divinylbenzene (TUS/DOU) between 0.8 and 1.1, a molecular weight distribution of less than 4, and a homogeneous composition distribution, and having the structural formula

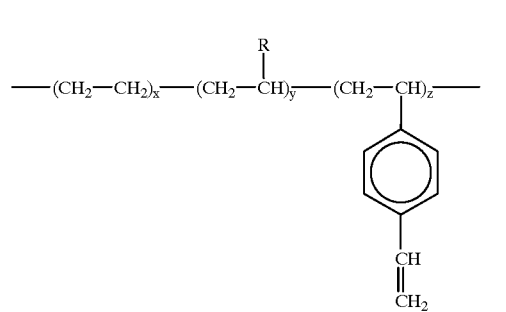

(I)

in which R is a linear or branched $C_1$ to $C_{10}$ alkyl group or a phenyl or alkyl-substituted phenyl group, x+y is the mole % of alpha-olefin units in the copolymer, z is the mole % of divinylbenzene units in the copolymer, the sum of x+y is from 50 to 99.9, and the sum of x+y+z is 100. The copolymers are prepared in the presence of a bridged metallocene catalyst having a spacial opening at the metal active site of between 135 and 105° for reacting with only one of the two vinyl groups in the divinylbenzene comonomer, which assures the formation of linear copolymers without detectable branching structure.

14 Claims, No Drawings

U.S. PATENT DOCUMENTS

| | | | |
|---|---|---|---|
| 5,272,236 | 12/1993 | Lai et al. | 526/348.5 |
| 5,286,800 | 2/1994 | Chung et al. | 525/288 |
| 5,401,805 | 3/1995 | Chung et al. | 525/288 |
| 5,504,171 | 4/1996 | Etherton et al. | 526/336 |
| 5,543,484 | 8/1996 | Chung et al. | 526/347.1 |
| 5,608,009 | 3/1997 | Machida et al. | 525/247 |
| 5,703,187 | 12/1997 | Timmers | 526/282 |
| 5,866,659 | 2/1999 | Chung et al. | 525/279 |
| 5,929,185 | 7/1999 | Rosch et al. | 526/336 |

OTHER PUBLICATIONS

Aaltonen, et al, *Macromolecules*, vol. 27, pp. 3136–3138 (1994).

Soga, *Macromolecules*, vol. 22, No. 7, pp. 2875–287 (1989).

Miyatake, et al, *Makromol. Chem. Macromol. Symp.*, vol. 66, pp. 203–215 (1993).

Chinsrikul, et al, *J. Thermoplastic Comp. Mat.*, vol. 6, pp. 18–28 (1993).

Koo, et al, *Macromolecules*, vol. 32, pp. 981–988 (1999).

Fu, et al, *J. Am. Chem. Soc.*, vol. 117, pp. 10747–10748 (1995).

Koo, et al, *J. Am. Chem. Soc.*, vol. 120, pp. 4019–4020 (1998).

Mulhaupt, et al, *Polymers for Advanced technologies*, vol. 4, pp. 439–449 (1993).

Chung, et al, *Polymer*, vol. 38, No. 6, pp. 1495–1502 (1997).

Lu, et al, *Macromolecules*, vol. 31, No. 17, pp. 5943–5946 (1998).

Lu, et al, *Macromolecules*, vol. 32, No. 8, pp. 2525–2533 (1999).

LINEAR COPOLYMERS OF ALPHA-OLEFINS AND DIVINYLBENZENE HAVING NARROW MOLECULAR WEIGHT AND COMPOSITION DISTRIBUTIONS AND PROCESS FOR PREPARING SAME

FIELD OF THE INVENTION

The invention relates to a process for copolymerizing alpha-olefins and divinylbenzene, which process utilizes certain metallocene catalysts to produce alpha-olefin/divinylbenzene copolymers having a linear copolymer structure and narrow molecular weight and composition distributions.

The invention also relates to linear alpha-olefin/divinylbenzene copolymers that are prepared in accordance with the process of this invention, wherein the linear alpha-olefin/divinylbenzene copolymers range from semicrystalline thermoplastic to amorphous elastomer copolymers. The copolymers of this invention are useful as such and as versatile intermediates for the preparation of functionalized polyolefins and polyolefin graft copolymers containing polyolefin backbone and other polymer chains.

BACKGROUND OF THE INVENTION

Although useful in many commercial applications, polyolefin homopolymers, such as high density polyethylene (HDPE) and isotactic polypropylene (i-PP), suffer poor interaction with other materials. The inert nature of polyolefins significantly limits their end uses, particularly those in which adhesion, dyeability, paintability, printability or compatibility with other functional polymers is paramount.

Unfortunately, because of their inert nature and crystallinity, polyolefins have been among the more difficult materials to chemically modify by means of post-polymerization processes. In many cases, the post-polymerization reactions result in serious side reactions, such as degradation and crosslinking reactions. Although the direct copolymerization is the most effective route to functionalize polyolefins, such direct processes usually are laden with difficulties and limitations.

Only the transition metal coordination catalysts (Ziegler-Natta and metallocene catalysts) can be used in the preparation of linear polyolefins, and it normally is difficult to incorporate functional group-containing monomers into the polyolefins by using the early transition metal catalysts due to catalyst poisoning (see J. Boor, Jr., *Ziegler-Natta Catalysts and Polymerizations,* Academic Press, New York, 1979). The Lewis acid components (Ti, V, Zr and Al) of the catalyst will tend to complex with nonbonded electron pairs on N, O, and X (halides) of functional monomers in preference to complexation with the π-electrons of the double bonds. The net result is the deactivation of the active sites by formation of stable complexes between catalysts and functional groups, thus inhibiting polymerization.

In several patents (see U. S. Pat. Nos. 4,734,472; 4,751,276; 4,812,529; 4,877,846), it has been taught to prepare borane-containing polyolefins. The chemistry disclosed in such patents involves a direct polymerization using organoborane-substituted monomers and alpha-olefins in Ziegler-Natta and metallocene processes. The homo- and copolymers containing borane groups are very useful intermediates for preparing a series of functionalized polyolefins. Many new functionized polyolefins with various molecular architectures have been obtained based on this chemistry. In addition, it has been demonstrated that polar groups can improve the adhesion of polyolefins to many substrates, such as metals and glass (see Chung et al, *J. Thermoplastic Composite Materials,* 6, 18, 1993 and *Polymer,* 35, 2980, 1994). The chemistry of borane-containing polymers also has been extended to the preparation of polyolefin graft copolymers, which involves free radical graft-from reaction (see U.S. Pat. Nos. 5,286,800 and 5,401,805). In polymer blends, compatibility of the polymers can be improved by adding a suitable polyolefin graft copolymer which reduces the domain sizes and increases the interfacial interaction between domains (see Chung et al, *Macromolecules,* 26, 3467, 1993; *Macromolecules,* 27, 1313, 1994).

Another approach toward preparing functionalized polyolefins is the preparation of unsaturated polyolefin copolymers containing pending unsaturated side chains which are reactive in subsequent chemical functionalization reactions. In general, the transition metal (Ziegler-Natta and metallocene catalysts) copolymerization of alpha-olefin and diene monomer is a great concern with many potential side reactions. The diene monomer, containing two reactive sites, potentially may engage in a double addition reaction to form copolymers having long branching side chains or even three dimensional network (crosslinked) structures. Most of linear diene-containing copolymers that have been reported involve the use of asymmetric dienes (see U.S. Pat. Nos. 3,658,770; 4,680,318; and 4,366,296) which contain only one polymerizable olefin unit, either an alpha-olefin or a constrained cycloolefin moiety, to prevent the formation of crosslinked (unprocessible) products. The asymetric dienes include those containing an alpha-olefin unit and an internal olefin unit, such as 1,4-hexadiene and methyl-1,4-hexadiene, and those containing a constrained cycloolefin unit and a linear olefin unit, such as 2-methylene-5-norborene, 5-vinyl-2-norborene and dicyclopentadiene. Several unsaturated polyolefins have been reported, including unsaturated polyethylene copolymers (Marathe et al. *Macromolecules,* 27, 1083, 1994), polypropylene copolymers (Kitagawa et al., *Polymer Bulletin,* 10, 109, 1983) and ethylene-propylene terpolymers (VerStrate et al, *Encyclopedia of Polym. Sci. and Eng.,* 6, 522, 1986). Recently, Machida et al. (JP 05-194665 and JP 05-194666) also reported the copolymerization of alpha-olefins and asymetric styrenic diene comonomers, such as p-(3-butenyl) styrene, to produce linear copolymers using Ziegler-Natta heterogeneous catalysts.

Alpha-olefin polymerization involving symmetric alpha, omega-diene comonomers in which both double bonds are terminal alpha-olefins are very limited. One such polymerization, which involved the copolymerization of alpha-olefin and 1,3-butadiene (Bruzzone et al., *Makromol. Chem.,* 179, 2173, 1978; Cucinella et al., *European Polym. J.,* 12, 65, 1976), resulted in copolymers where the butadiene units in the copolymer were mostly in the trans-1,4-configuration. In other words, both alpha-olefins in the butadiene monomer were engaged in the polymerization reaction. Some diene comonomers having a long spacer between two terminal olefins, including $C_8$–$C_{14}$ aliphatic alpha,omega-dienes, such as 1,7-octadiene, 1,9-decadiene, 1,11-dodecadiene and 1,13-tetradecadiene (see U.S. Pat. Nos. 4,551,503; 4,340,705; and 5,504,171), were found to be more selective so as to engage only one olefin group in the heterogeneous Ziegler-Natta copolymerization reaction. The resulting polyolefin copolymers have pending alpha-olefin groups located along the polymer chain.

Incorporating divinylbenzene (a symmetric alpha,omega-diene) comonomer into a linear polyolefin would result in polyolefin copolymers containing pending styrene groups, as illustrated below in Formula (I). Such copolymers could be used as versatile precursors for a broad range of polyolefin structures, including the polyolefin graft copolymers containing polyolefin backbone and other polymer side chains. However, it is very difficult to prepare linear polyolefin copolymers having a well-defined molecular structure, as illustrated in Formula (I), due to potential branching and crosslinking reactions, resulting from the difuntional nature of divinylbenzene.

The transition metal copolymerization of styrenic monomers and alpha-olefins usually is very difficult to accomplish (see Seppala et al., *Macromolecules*, 27, 3136, 1994 and Soga et al., *Macromolecules*, 22, 2875, 1989). This is especially true when using stereospecific heterogeneous Ziegler-Natta catalysts having multiple active sites, since the reactivity of monomer is sterically controlled, i.e., the larger the size of the monomer, the lower the reactivity; and those few styrenic copolymers that are known tend to be very inhomogeneous (Mijatake, et al., *Makromol. Chem. Macromol. Synp.*, 66, 203, 1993; Aaltonen, et al., *Macromolecules*, 27, 3136, 1994; and U.S. Pat. No. 5,543,484) and to have broad molecular weight and composition distributions.

The copolymerization of alpha-olefin and divinylbenzene by Ziegler-Natta catalysts has been disclosed (Yokoyama, et al., Eur. Pat. Appl. 88310305.3 and Yoshitake, et al., JP 62-241907). It also has been disclosed that the resulting copolymers can be used in the preparation of polyolefin graft copolymers (Yokoyama, et al., JP 03-255114; Tomita, et al., JP 08-003231, JP 08-003232 and JP 05-017539). However, as expected, the known copolymers of divinylbenzene and alpha-olefins, especially ethylene and propylene, are very inhomogeneous, showing broad composition and molecular weight distribution (Mw/Mn>6), due to multiple active sites and sterically-controlled monomer reactivity. Also, the extent of side reactions have not reported, possibly because it may be very difficult to determine the extent of side reactions due to the very low concentration of divinylbenezene in the copolymer products. The divinylbenzene content in the ethylene and propylene copolymers is below 0.3 mole % (1 wt %) and the overall divinylbenzene conversion is only few % in each case. In general, the catalyst activity is inversely proportional to the concentration of divinylbenzene in the monomer feed.

Machida, et al. (U.S. Pat. No. 5,608,009) also reported the copolymerization reaction of ethylene and diene comonomers (inlcuding divinylbenzene) by using metallocene catalysts. The diene-containing copolymers were used as intermediates in the preparation of graft copolymers, including long chain branching polyolefins. In general, the alpha-olefin/divinylbenzene copolymers reported by Machida, et al. were complex and had ill-defined molecular structures. Moreover, Machida, et al. failed to identify the reaction conditions that are necessary to prepare copolymers having a linear molecular structure and narrow composition and molecular weight distributions (as discussed in Column 16, lines 41–45, the olefin copolymers obtained by Machida, et al were long-branched copolymers). The disclosed examples of copolymerization reactions between ethylene and divinylbenzene involved using dicyclopentadienylzirconium dichloride (in Example I) and cyclopentadienylzirconium trimethoxide (in Example 3) as the catalyst system. The molecular structures of the resulting ethylene/divinylbenzene copolymers were complex and the copolymers were characterized by a low molecular weight (Mw= 5,670 in Example 1 and Mw=14,500 in Example 3) and broad molecular weight distributions (Mw/Mn=6.6 in Example 1 and Mw/Mn=23 in Example 3). The inhomogeneous and non-linear copolymer structures were clearly revealed by the ratio of unsaturation/divinylbenzene (TUS/DOU) in the copolymers, the ratios being 0.71 (in Example 1) and 7.55 (in Example 3) using dicyclopentadienylzirconium dichloride and cyclopentadienyltitanium trimethoxide, respectively.

It is well known that metallocene polymerization results in polymers that are terminated mainly by beta-hydride elimination to form an unsaturated site at the chain end. Accordingly, it would be logical that the TUS/DOU ratio should be near unity for a linear copolymer of the type contemplated by the present invention, as illustrated in Formula (I). Thus, for a linear polymer, it would be expected that as the polymerization reaction continues and as the molecular weight increases (and as divinylbenzene units become incorporated into the copolymer), the contribution of chain end unsaturation to the TUS/DOU ratio would be very small. In other words, the TUS/DOU ratio should remain at or very close to unity. Similarly, it would be logical to assume that a copolymer that is characterized by a TUS/DOU ratio that deviates substantially from unity would be a non-linear, inhomogeneous copolymer containing many chain ends. For the known ethylene/divinylbenzene copolymers that were prepared using dicyclopentadienylzirconium dichloride (Example 1, above), the ratio of TUS/DOU=0.71 strongly suggests that a good portion of the divinylbenzene units that were incoporated into the copolymer had undergone double addition reactions at both vinyl groups to produce a polymer having a long-chain branching structure. Overall, the prior disclosures fail to identify the reaction conditions, especially the catalyst systems, that are necessary to prepare linear alpha-olefin/divinylbenzene copolymers having narrow composition and molecular weight distributions.

In general, the advances in metallocene catalysts (see U.S. Pat. Nos. 4,542,199; 4530,914; 4,665,047; 4,752,597; 5,026, 798 and 5,272,236) provide an excellent opportunity for chemists to prepare new polyolefin polymers. With well-defined (single-site) catalysts and a designed active site geometry, monomer insertion can be controlled effectively, both kinetically and sterically, during a polymerization process. This is especially important for copolymerization reactions for producing copolymers having a relatively well-defined molecular structure. Several prior publications have disclosed the use of metallocene catalysts having a constrained ligand geometry for producing narrow composition distribution and narrow molecular weight distribution linear low density polyethylene (LLDPE).

For copolymerization reactions, use of a relatively opened active site metallocene catalyst provides essentially equal access for both comonomers, and the incorporation of higher molecular weight olefin comonomer is significantly higher than for those copolymers obtained from tranditional Ziegler-Natta catalysts. In fact, some metallocene catalysts with constrained ligand geomerty and opened active site have shown to be effective for incorporation of styrenic monomers in polyolefin copolymers, including poly (ethylene-co-styrene) (U.S. Pat. No. 5,703,187) and poly (ethylene-co-p-methylstyrene), poly(ethylene-ter-propylene-ter-p-methylstyrene) and poly(ethylene-ter-1-octene-ter-p-methylstyrene) (U.S. Pat. No. 5,543,484, and *J. Polym. Sci. Polym Chem.*, 36, 1017, 1998, *Macromolecules*, 31, 2028, 1998).

SUMMARY OF THE INVENTION

The invention relates to copolymers containing alpha-olefin and divinylbenzene comonomer units, which copolymers have a linear molecular structure and are characterized by a mole ratio of unsaturation/divinylbenzene (TUS/DOU) near unity. The copolymers are also characterized by a narrow molecular weight distribution and a narrow composition distribution, and may be represented by the following structural Formula (I):

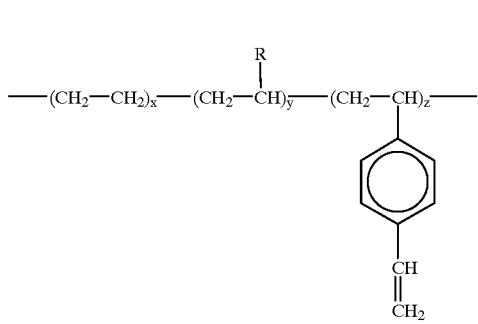

in which R is a linear or branched alkyl group, or a cyclic aliphatic or aromatic group, x represents the mole % of ethylene units in the copolymer, y represents the mole % of alpha-olefin comonomer units in the copolymer, and z represents the mole % divinylbenzene units in the copolymer. Preferably, R is a $C_1$ to $C_{10}$ linear or branched alkyl group or a $C_6$ to $C_{10}$ substituted or unsubstituted aromatic group, and most preferably, R is $C_1$ to $C_6$ alkyl group or substituted or unsubstituted $C_6$ aromatic group. The value of x may vary from 0% to about 99.9%, as may the value of y; provided, however, that the combined value of alpha-olefin mole % (x+y) in the copolymer is between about 50 and 99.9%. Preferably, x+y is between 85 and 99.9%, and most preferably x+y is between 95 and 99.9%. The sum of x, y and z (mole % of divinylbenzene) is 100%. The mole ratio of unsaturation/divinylbenzene (TUS/DOU) in the copolymers is near unity, typically between 0.8 and 1.1. Preferably, the TUS/DOU ratio is between 0.9 and 1, and most preferably ratio is between 0.95 and 1. The copolymers of this invention have a number average molecular weight (Mn) of at least about 1,000, and preferably at least about 10,000. The copolymers also preferably have a molecular weight distribution (ratio of weight average molecular weight (Mw) to number average molecular weight (Mn), or Mw/Mn) of less than about 4. Preferably, Mw/Mn is less than 3. Furthermore, the copolymers have narrow composition distribution with the incorporated divinylbenzene units being distributed homogeneously along all of the polymer chains.

The invention also relates to a polymerization process for producing alpha-olefin/divinylbenzene copolymers (1) having a linear molecular structure, a mole ratio of unsaturation/divinylbenzene (TUS/DOU) near unity, and narrow molecular weight and composition distributions. The process involves contacting the alpha-olefin and divinylbenzene comonomers under copolymerization reaction conditions in the presence of a single-site metallocene catalyst having substituted covalently-bridged ring ligands and a specific opening at the metal active site, as illustrated below:

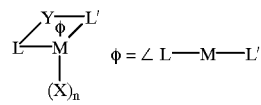

where M is a transition metal of group 3 or group 4 of the Periodic Table of the Elements; L and L', independently, are selected from —NR'—, —PR'—, cyclopentadienyl or substituted cyclopentadienyl groups bound in an $\eta^5$ bonding mode to M, wherein at least one of L and L' is a cyclopentadienyl or a substituted cyclopentadienyl group, and wherein each occurrence of R', independently, is selected from the group consisting of hydrogen, alkyl, aryl, silyl, halogenated alkyl, halogenated aryl, and mixtures thereof, Y is a moiety selected from —SiR$_2$'—, —CR$_2$'—, and —CR$_2$'—CR$_2$'—; X is selected from hydride, halo, alkyl, aryl, aryloxy, and alkoxy; and n is 0, 1 or 2; and the angle, φ, formed at the metal center between two L and L' ligands, such as the centroid of two cyclopentadienyl or substituted cyclopentadienyl groups, is between 135° and 105°. Preferably, the value of φ is between 130° and 115°, and most preferably, the value of φ is between 128° and 120°.

The constrained ligand geometry associated with the covalently-bridged ligands results in a specific space opening at the metal active site, which provides the selective reaction with only one of the two vinyl groups in divinylbenzene during the copolymerization between alpha-olefins and divinylbenzene. In other words, the catalysts contemplated for use in the present invention can effectively incorporate divinylbenzene into the copolymer chain through single enchainment, but show poor reactivity to the styrenic units already existing in the copolymer (I).

The metallocene catalysts contemplated for use in this invention may be used as such. However, as is known, the catalysts may be used in conjunction with a cocatalyst or activator, such as aluminoxane and tris(pentafluorophenyl) borane.

In accordance with another embodiment of the invention, functionalized polyolefins and graft copolymers are prepared by chemically reacting the pending styrene units in the alpha-olefin/divinylbenzene copolymers (I). The resulting functionalized polyolefins and graft copolymer may be illustrated in Formula (II), below:

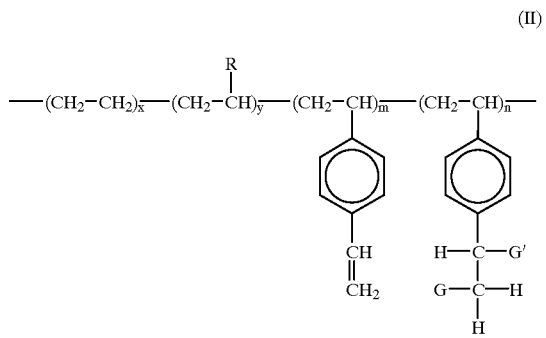

in which R is defined above in connection with Formula (I). G and G', independetly, are selected from —H, —OH, epoxy, —NH$_2$, —COOH, anhydride, —Cl, —Br, —M, —COOM (M=metals, e.g. Li, Na, K and Ca) or a polymer chain having a molecular weight of at least about 500, which can be derived from both step and chain polymerization reactions; x and y are as previously defined in connection with Formula (I); m is the mole % of divinylbenzene units remaining in the functionalized copolymer; n is the mole % of functionalized styrenic units and is at least 0.1%; and the sum of x, y, m and n is 100%. As indicated in connection with Formula (I), the combined alpha-olefin mole % (x+y) in the functionalized copolymer (Formula (II)) is between about 50 and 99.09%. Preferably, x+y is between 85 and 99.9%, and most preferably x+y is between 95 and 99.9%. The backbone polymer chain (Formula (I)) has a number average molecular weight (Mn) of at least about 1,000, and preferably at least about 10,000.

DETAILED DESCRIPTION

This invention is based on the discovery that with certain metallocene catalysts the effective copolymerization reaction of alpha-olefin and divinylbenzene can take place to produce alpha-olefin/divinylbenzene copolymers having a linear copolymer structure. The unsaturation/divinylbenzene (TUS/DOU) ratio in the copolymers (I) is near unity, the copolymers do not contain any substantial branching or crosslinking (no branching or crosslinked structures were detected in the copolymers that were produced), and the copolymers are completely soluble and processible. The copolymers comprise the direct copolymerization product of alpha-olefin having from 2 to 12 carbon atoms and divinylbenzene, and are high molecular weight linear polymers having a substantially homogeneous molecular structure, i.e. narrow molecular weight and composition distributions. The copolymers may be illustrated by the following formula:

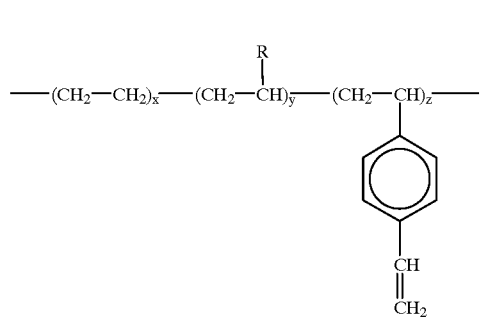

(I)

in which R is a linear or branched alkyl group or a cyclic aliphatic or aromatic group. Preferably, R is $C_1$ to $C_{10}$ linear and branched alkyl or a $C_1$ to $C_{10}$ substituted or unsubstituted aromatic group, and most preferably R is $C_1$ to $C_6$ alkyl group or a $C_6$ substituted or unsubstituted aromatic group, e.g. phenyl or alkyl-substituted phenyl.

The TUS/DOU ratio is near unity, and typically is between 0.8 and 1.1. Preferably, the TUS/DOU ratio is between 0.9 and 1, and most preferably ratio is between 0.95 and 1. In the formula (I), x represents the mole % of ethylene units in the copolymer, y represents the mole % of alpha-olefin comonomer units in the copolymer, and z represents the mole % divinylbenzene units in the copolymer. The value of x may vary from 0% to about 99.9%, as may the value of y; provided, however, that the combined value of alpha-olefin mole % (x+y) in the copolymer is between about 50 and 99.9%. Preferably, x+y is between 85 and 99.9%, and most preferably x+y is between 95 and 99.9%. The sum of x, y and z (mole % of divinylbenzene) is 100%.

The copolymers of this invention have a number average molecular weight (Mn) of at least about 1,000, and preferably at least about 10,000. Typically, the copolymers have a number average molecular weight of from about 20,000 up to about 200,000. The copolymers also preferably have a molecular weight distribution (ratio of weight average molecular weight (Mw) to number average molecular weight (Mn), or Mw/Mn) of less than about 4. Preferably, Mw/Mn is less than 3, for example, from about 1.9 to about 2.8. Furthermore, the copolymer have narrow composition distribution with the incorporated divinylbenzene units homogeneously distributed along all the polymer chains.

As disclosed herein, the copolymerization of alpha-olefin (such as ethylene and propylene) and divinylbenzene using a metallocene (single-site) coordination catalyst is greatly dependent on the geometry of the active site. The metallocene catalysts having non-bridged ligand geometry, such as dicyclopentadienylzirconium dichloride/ methylaluminoxane, have a very limited opening at the active metal site ($\phi$>135°) and greatly favor the incorporation of small size monomers. Therefore, only very low % of divinylbenzene can be incorporated into the copolymers having ethylene and propylene monomer units when using a non-bridged metallocene as the catalyst. On the other hand, metallocene catalysts having highly constrained ligand geometry, and which have active sites that are very opened ($\phi$<105°), are capable of copolymerizing alpha-olefin(s) and divinylbenzene. However, when using metallocene catalysts having such very open active sites (i.e. <105°) double enchainment of both vinyl groups in divinylbenzene comonomer is highly likely to occur during the copolymerization process, which results in copolymers having branched or/and crosslinked structures.

Thus, the invention involves the use of metallocene catalysts having a specific ligand geometry and a specified opening at the active metal site, which can effectively and selectively react with only one of the two vinyl groups in the divinylbenzene comonomer during alpha-olefin and divinylbenzene copolymerization reactions. The specific single-site metallocene catalysts contemplated for use in the present invention have substituted covalently-bridged ring ligands are illustrated below.

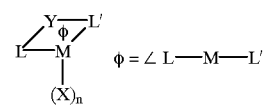

wherein M is a transition metal of group 3 or 4 of the Periodic Table of the Elements; L and L', independently, are selected from —NR'—, —PR'—, cyclopentadienyl or substituted cyclopentadienyl groups bound in an $\eta^5$ bonding mode to M, wherein at least one of L and L' is a cyclopentadienyl or substituted cyclopentadienyl group, and wherein each occurrence of R', independently, is selected from the group consisting of hydrogen, alkyl, aryl, silyl, halogeneated alkyl, halogenated aryl, and mixtures thereof; Y is a moiety selected from —SiR$_2$'—, —CR$_2$'—, and —CR$_2$'—CR$_2$'—, where R' is as previously defined; X is selected from hydride, halo, alkyl, aryl, aryloxy, and alkoxy; and n is 0, 1 or 2.

The catalysts to be used in this invention are further defined by a geometry angle, $\phi$, formed at the metal center between two L and L' ligands, such as the centroid of two cyclopentadienyl or substituted cyclopentadienyl groups. The value of $\phi$ must be between 135° and 105°. Preferably, the value of $\phi$ is between 130° and 115°, and most preferably, the value of $\phi$ is between 128° and 120°.

Catalysts which may be used in the present invention include, for example, ethylenebis (indenyl) zirconium dichloride, ethylenebis (tetrahydroindenyl) zirconium dichloride, ethylenebis (indenyl) dimethylzirconium, and the like. The amount of such catalysts employed will depend on the desired molecular weight and the desired molecular weight distribution of the copolymer being produced, but will generally range from about 20 ppm to 1 wt. %, and preferably from about 0.001 to 0.2 wt. %, based upon the total amount of monomer to be polymerized therein.

Metallocene catalysts are known to be activated with a cocatalyst, which typically is a Bronsted acid salt with a noncoordinating anion. Accordingly, it is preferred to use the metallocene catalysts in combination with a cocatalyst. Non-limiting examples of cocatalysts that are contemplated for use in this invention include aluminoxane, tris (pentafluorophenyl)borane, trimethylammonium tetraphenylborate, triethylammonium tetrakis (pentafluorophenyl)borate, and the like.

The constrained ligand geometry associated to the covalently-bridged ligands results in the specific space opening at the metal active site, which provides for the selective reaction with only one of the two vinyl groups in divinylbenzene during the copolymerization between alpha-olefins and divinylbenzene. In other words, the catalyst can effectively incorporate divinylbenzene into polymer through single enchainment, but shows poor reactivity to the styrenic units already existing in the copolymer (1). The selective copolymerization of divinylbenzene is illustrated below:

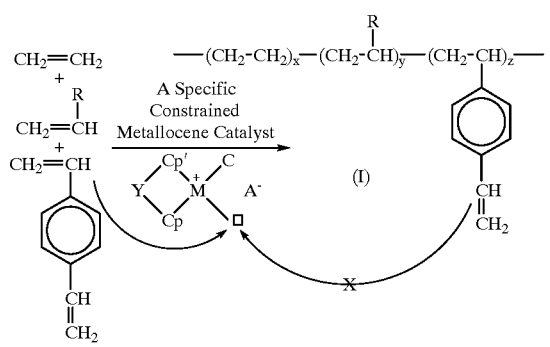

Since only one vinyl group in the divinylbenzene monomer takes part in the copolymerization reaction, side reactions (described in the prior art) involving styrene pending vinyl groups in the copolymer (I) and producing branched polymers or crosslinked polymers can be avoided. The resulting copolymer (I) is a linear soluble polymer and has an unsaturation/divinylbenzene (TUS/DOU) ratio near unity. In addition, since the catalysts suitable for use in the present invention have a geometry angle φ that is favorable for divinylbenzene incorporation (involving only a single vinyl group) the resulting copolymers are linear copolymers containing a substantial and broad range of divinylbenzene contents, as well as narrow molecular weight and composition distributions.

Suitable diluents for the monomers, catalyst components and polymeric reaction products include the general group of aliphatic and aromatic hydrocarbons, used singly or in a mixture, such as propane, butane, pentane, cyclopentane, hexane, toluene, heptane, isooctane, and the like. The copolymers of the present invention can be prepared by a slurry process wherein the copolymers are formed in the diluents employed, or by a homogeneous solution process, depending on the alpha-olefin feed. However, the use of a slurry process is preferred, since, in that case, lower viscosity mixtures are produced in the reactor, and slurry concentrations up to 40 wt. % of polymer are possible. At higher slurry concentrations, it is possible to operate a more efficient process in which it is necessary to recycle less of the reactants and diluent for each unit of polymer produced.

In general, the polymerization reactions of the present invention are carried out by contacting a mixture of divinylbenzene and alpha-olefin (e.g., ethylene and propylene with constant pressure) in a reactor in the presence of the catalyst and diluent under copolymerization conditions. Typically, the polymerization reactions would be carried out in a reactor equipped with means for thoroughly mixing the comonomers, catalyst and diluent, and for controlling the reaction temperature between 0 and about 80° C.

The polymerization may be carried out under batch conditions, such as in an inert gas atmosphere and in the substantial absence of moisture. Preferably, however, the polymerization is carried out continuously in a typical continuous polymerization process with inlet pipes for monomers, catalysts and diluents, temperature sensing means and an effluent overflow to a holding drum or quench tank. The overall residence time can vary, depending upon, e. g., catalyst activity and concentration, monomer concentration, reaction temperature, monomer conversion and desired molecular weight, and generally will be between about thirty minutes and five hours, and preferably between about 1 and 2 hours.

The resulting copolymers typically would be weighed and analyzed by nuclear magnetic resonance (NMR), differential scanning calorimetry (DSC) and gel permeation chromatography (GPC) to determine the monomer conversion, copolymer composition, thermal transition temperature and molecular weight, respectively.

The extent of double enchainment can be quantified by $^1$H NMR spectrum to determine the unsaturation/divinylbenzene (TUS/DOU) ratio of the copolymer. Thus, for a linear copolymer of the Formula (I), without any double enchainment at the incorporated divinylbenzene units, a $^1$H NMR spectra would show four chemical shifts near 5.3, 5.8, 6.8 and 7.0–7.4 ppm (with the integrated peak intensity ratio=1:1:1:4), corresponding to three individual vinyl protons and four aromatic protons in the pending styrene unit. One can also observe a small peak at 4.7 ppm in low molecular weight copolymers, due to the terminal vinyl group at the chain end. In most high molecular weight copolymer cases, the terminal vinyl group is less than 10% of the vinyl groups derived from divinylbenzene units. Therefore, the ratio of unsaturation/divinylbenzene (TUS/DOU) in the linear alpha-olefin copolymers of this invention is always near unity. A significant deviation of this peak intensity ratio from unity indicates the extent of double bond enchainment in the incorporated divinylbenzene units, which results from branching and/or crosslinking in the copolymer. As will be seen in the examples hereinbelow, a good correlation was observed between the reduction of TUS/DOU ratio and the reduction of copolymer processibility (solubility), due to the presence of crosslinking in certain copolymers. In further connection with TUS/DOU ratios, it will be appreciated that a high TUS/DOU ratio (considerably higher 1) will be observed for low molecular weight copolymers which do not have any divinylbenzene units and have only a terminal vinyl group. On the other hand, a low TUS/DOU ratio (considerably lower than 1) would be observed if a significant portion of the divinylbenzene units incorporated in the copolymer engaged in double enchainment to produce a copolymer having a long-chain branched structure.

One major advantage of the alpha-olefin and divinylbenzene copolymers (I) is the existence of numerous pendant styrene groups along the backbone. The pendant styrene groups are very reactive in many chemical reactions, including free radical, cationic, anionic and transition metal coordination reactions, and can serve as the reactive sites for selective functionalization reactions to produce functionalized polyolefins, or they can serve as the monomers for subsequent graft reactions which produce polyolefin graft copolymers having polyolefin backbone and other polymer side chains. The formula of functionalized polyolefins and graft copolymer in accordance with the invention may be illustrated as follows:

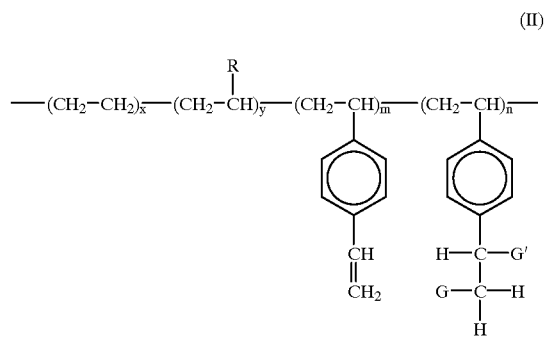

in which R is a linear or branched alkyl group, or a cyclic aliphatic or aromatic group. Preferably, R is a $C_1$ to $C_{10}$ linear or branched alkyl group or a $C_6$ to $C_{10}$ substituted or unsubstituted aromatic group, and most preferably, R is $C_1$ to $C_6$ alkyl group or substituted or unsubstituted $C_6$ aromatic group. G and G', independently, are selected from —H, —OH, —NH$_2$, —COOH, —Cl, —Br, —M, —COOM (M=metals, e.g. Li, Na, K and Ca), or a polymer chain having a molecular weight of at least about 500, which can be derived from step and chain polymerization reactions. In the functionalized copolymer (II), the combined alpha-olefin mole % (x+y) is between about 50 and 99.9. Preferably, x+y is between 85 and 99.9, and most preferably x+y is between 95 and 99.9. The sum of x, y, m and n is 100%, where m is the mole % of divinylbenzene moieties remaining in the functionalized copolymer and n is the mole % of functional moieties, with n being at least 0.1%. The number average molecular weight(Mn) of the backbone polymer chain is at least about 1,000, and preferably at least about 10,000.

All of the reactions that introduce functionality into the alpha-olefin/divinylbenzene copolymers (I) are post-polymerization reactions, which can be run on bulk, finely dispersed slurries, or homogeneous polymer solutions. Usually, bulk reactions also can be performed in an extruder, or other internal mixer, suitably modified to provide adequate mixing. The details of such bulk reactions are set forth in U.S. Pat. No. 4,548,995, which is incorporated herein by reference. Solution processes are advantageous in that they permit good mixing and control of modification conditions to be achieved. Solution processes also facilitate removal of undesired by-products. Disadvantages of solution processes include the need for removal of residual unreacted divinylbenzene prior to chemical modification reactions.

As suggested above, pendant styrene moieties in alpha-olefin/diviylbenzene copolymers (I) react in a manner similar to styrene monomers, which are very reactive in many chain polymerization reactions, including free radical, cationic, anionic and transition metal coordination reactions. Accordingly, in the presence of other monomers and catalyst, the alpha-olefin/diviylbenzene copolymers (I) undergo a polymerization reaction involving the styrene groups in alpha-olefin/diviylbenzene copolymer to form the graft copolymer (II). Most graft reactions take place in homogeneous solution or finely dispersed slurry solution.

The following examples are illustrative of the invention.

EXAMPLE 1

Synthesis of Poly(ethylene-ter-1-octene-ter-divinylbenzene) by Et(Ind)$_2$ZrCl$_2$/MAO catalyst In a terpolymerization reaction, 1-octene (80 mmol) and divinylbenzene (20 mmol) were mixed with 100 ml of hexane and 3 ml of methylaluminoxane (MAO) (2.5 M in toluene) in a sealed Parr 450 mL stainless autoclave equipped with a mechanical stirrer. The sealed reactor was then saturated with 10 psi ethylene gas at 50° C. before adding an ethyldiindenylzirconium dichloride catalyst solution (Et(Ind)$_2$ZrCl$_2$ (2.5 μmol) in toluene) to initiate the polymerization. Additional ethylene was fed continuously into the reactor by maintaining a constant pressure (10 psi) during the entire course of the polymerization. After 30 minutes, the reaction was terminated by adding 100 mL of dilute HCl solution in methanol. The polymer was precipitated in methanol and isolated by filtration. Further purification was carried out by redissolving the polymer in hexane and reprecipitating it in methanol twice. After vacuum drying for 8 h, 3.79 g of ethylene/1-octene/divinylbenzene terpolymer were obtained. The terpolymer was completely soluble in common organic solvents, such as hexane, toluene and tetrahydrofuran (THF). The terpolymer composition (69.4 mol % ethylene, 28.6 mol % 1-octene, and 2.0 mol % DVB) and molecular weight (Mw=92,900 and Mn=43,300) were analyzed by $^1$H NMR and gel permeation chromatography (GPC), respectively. The mole ratio of unsaturation/divinylbenzene moieties (TUS/DOU) is near unity. The glass transition temperature of the terpolymer (Tg=−57° C.), was measured by differential scanning calorimetry (DSC). The sharp Tg transition with flat baseline indicates homogeneous terpolymer microstructure.

EXAMPLES 2–7

Synthesis of Poly(ethylene-ter-1-octene-ter-divinylbenzene) by Et(Ind)$_2$ZrCl$_2$/MAO catalyst In a series of Examples, high molecular weight of linear ethylene/1-octene/divinylbenzene copolymers were prepared in accordance with the procedures described in Example 1. The composition and molecular weight (and molecular weight distribution) of terpolymer were determinated by $^1$H NMR and gel permeation chromatography (GPC), respectively. The glass transition temperature (Tg) was measured by differential scanning calorimetry (DSC). All terpolymerization reactions of ethylene/1-octene/divinylbenzene were very effective when using Et(Ind)$_2$ZrCl$_2$/MAO catalyst. A broad composition range of terpolymers was obtained with high molecular weight, and narrow molecular weight distribution. In general, the terpolymers exhibit a mole ratio of TUS/DOU near unity and a low Tg (<−40° C.) in a wide range of copolymer compositions, even those having relatively high divinylbenzene contents (e.g., 8 mole %).

EXAMPLES 8–11

Synthesis of Poly(ethylene-ter-1-octene-ter-divinylbenzene) by [C$_5$Me$_4$(SiMe$_2$N$^t$Bu)]TiCl$_2$/MAO catalyst In a series of Examples, ethylene, 1-octene and divinylbenzene were terpolymerized in the presence of a catalyst system consisting of dicyclopentadienyldimethylsilyl-t-butyl aminotitanium dichloride/methylaluminoxane ([C$_5$Me$_4$(SiMe$_2$N$^t$Bu)]TiCl$_2$/MAO). The reaction procedures described in Example 1 were followed by adding 1-octene, divinylbenzene, hexane and methylaluminoxane (MAO) into a Parr 450 ml stainless autoclave reactor. Ethylene gas was then connected to the reactor. After saturating with ethylene gas at 50° C., the polymerization reaction was initiated by charging [C$_5$Me$_4$(SiMe$_2$N$^t$Bu)]TiCl$_2$ (2.5 mmol) in toluene solution into the monomer mixture. Some terpolymers produced were not completely soluble. The soluble portions were analyzed by $^1$H NMR and DSC. In general, the [C$_5$Me$_4$(SiMe$_2$N$^t$Bu)]TiCl$_2$/MAO catalyst showed good divinylbenzene incorporation in the terpolymer, even up to 26 mole % divinylbenzene content. However, the mole ratio of unsaturation/divinylbenzene moieties (TUS/DOU) in each copolymer was well-below unity, indicating some secondary reaction having occurred at the pendant styrene groups in the copolymer.

EXAMPLES 12–15

Synthesis of Poly(ethylene-ter-1-octene-ter-divinylbenzene) by Cp$_2$ZrCl$_2$/MAO catalyst Another series of Examples was conducted to evaluate the terpolymerization of ethylene, 1-octene and divinylbenzene in the presence of dicyclopentadienylzirconium dichloride/methylaluminoxane catalyst (Cp$_2$ZrCl$_2$/MAO) by the reaction procedures described in Example 1. The terpolymers produced were not completely soluble. The soluble portions were analyzed by $^1$H NMR and DSC. In general, all reactions conducted in the presence of Cp$_2$ZrCl$_2$/MAO catalyst showed poor divinylbenzene incorporation, with TUS/DOU ratios well-below unity. DSC results showed some detectable melting peaks in each terpolymer, indicating an inhomogneous composition distribution.

EXAMPLE 16

Synthesis of Poly(ethylene-ter-propylene-ter-divinylbenzene) by Et(Ind)$_2$ZrCl$_2$/MAO catalyst In a terpolymerization reaction, divinylbenzene (10 mmol) was added into a Parr 450 ml stainless autoclave reactor with hexane (100 ml) and methylaluminoxane (3 ml, 2.5 M in toluene). Pre-mixed ethylene (40 psi) and propylene (60 psi) were then connected to the reactor. After saturating with both ethylene and propylene gases at 50° C., the total pressure in the reactor was controlled at 30 psi. The polymerization reaction was initiated by charging a Et(Ind)$_2$ZrCl$_2$ (2.5 mmol) in toluene solution into the monomer mixture. A constant, mixed ethylene/propylene pressure was maintained throughout the polymerization process. To assure a constant comonomer ratio, the polymerization was terminated within 15 minutes by adding dilute HCl/methanol solution. The polymer was isolated by filtration and was washed completely with methanol and dried under vacuum for 8 h. About 1.74 g of terpolymer was obtained, which was completely soluble in common organic solvents, such as hexane, toluene and tetrahydrofuran (THF). The terpolymer was analyzed by $^1$H NMR, GPC and DSC. The $^1$H NMR results showed that the terpolymer contained 56.4 mole % of ethylene, 42.5 mole % of propylene and 1.1 mole % of divinylbenzene, and the mole ratio of TUS/DOU was near unity. The GPC curve showed a high molecular weight terpolymer having a narrow molecular weight distribution. A sharp glass transition temperature (Tg) at –50° C., without any detectable melting peak, in the DSC curve indicated that the terpolymer had a narrow composition distribution.

EXAMPLES 17–21

Synthesis of Poly(ethylene-ter-propylene-ter-divinylbenzene) by Et(Ind)$_2$ZrCl$_2$/MAO catalyst In a series of Examples, high molecular weight ethylene/propylene/divinylbenzene terpolymers were prepared by the reaction procedures described in Example 16, except for the monomer feeds. In general, the incorporation of divinylbenzene in the ethylene-propylene-divinylbenzene terpolymer was effective when using Et(Ind)$_2$ZrCl$_2$ catalyst. Up to 20 mole % of divinylbenzene was observed in the terpolymers. All terpolymers produced were soluble in common organic solvents and were analyzed by $^1$H NMR, GPC and DSC. Each terpolymer exhibited a mole ratio of TUS/DOU near unity. The DSC results showed no detectable melting point (Tm) in the terpolymers. The sharp glass transition temperature (Tg) with flat baseline in each DSC curve indicated homogeneous terpolymer microstructures.

EXAMPLES 22–24

Synthesis of Poly(ethylene-ter-propylene-ter-divinylbenzene) by [C$_5$Me$_4$(SiMe$_2$N$^t$Bu)]TiCl$_2$/MAO catalyst A series of Examples was conducted to evaluate the terpolymerization of ethylene, propylene and divinylbenzene using [C$_5$Me$_4$(SiMe$_2$N$^t$Bu)]TiCl$_2$/MAO catalyst. The reaction procedures described in Example 16 were followed by adding divinylbenzene, hexane and methylaluminoxane (MAO) into a Parr 450 ml stainless autoclave reactor. Pre-mixed ethylene/propylene gases were then connected to the reactor. After saturating with both ethylene and propylene gases at 50° C., the total pressure in the reactor was controlled at 30 psi. The polymerization reaction was initiated by charging a [C$_5$Me$_4$(SiMe$_2$N$^t$Bu)]TiCl$_2$ (2.5 mmol) in toluene solution into the monomer mixture.

In general, the incorporation of divinylbenzene in the ethylene-propylene-divinylbenzene terpolymer was very effective when using [C$_5$Me$_4$(SiMe$_2$N$^t$Bu)]TiCl$_2$/MAO catalyst. However, most of the terpolymers produced were not completely soluble. Some insoluble gel particles, which are indicative of a degree of crosslinking, were observed. The terpolymers were analyzed by $^1$H NMR, GPC and DSC. The DSC curve for each terpolymer indicated no clear thermal transition with an uneven baseline.

EXAMPLES 25–33

Synthesis of Poly(ethylene-co-divinylbenzene) by Et(Ind)$_2$ZrCl$_2$/MAO catalyst In a series of Examples, high molecular weight of ethylene/divinylbenzene copolymers were prepared by batch slurry polymerization in a Parr 450 ml stainless autoclave equipped with a mechanical stirrer. After mixing the desired quantities of divinylbenzene, MAO and hexane in a reactor, the reactor was sealed and then saturated with ethylene gas at 50° C. under the ethylene pressure. An Et(Ind)$_2$ZrCl$_2$ (2.5 mmol) catalyst in toluene was added to initiate the polymerization. Additional ethylene was fed continuously into the reactor for maintaining a constant pressure during the entire course of the polymerization. The copolymerization reactions were terminated by adding 100 ml of dilute HCl solution in methanol. The polymers were isolated by filtration and were washed completely with methanol and dried under vacuum for 8 hrs.

In general, the incorporation of divinylbenzene in polyethylene was effective when using Et(Ind)$_2$ZrCl$_2$/MAO catalyst. The mole ratio of TUS/DOU for each copolymer was near unity. The copolymers were analyzed by $^1$H NMR, GPC and DSC. The relatively sharp and uniform GPC and DSC curves for all copolymers demonstrate narrow molecular weight distributions and substantially homogeneous composition distributions (i.e., compositional uniformity over the entire range of compositions).

EXAMPLE 34–38

Synthesis of Poly(propylene-co-divinylbenzene) by MgCl$_2$/TiCl$_4$/ED/AlEt$_3$ Catalyst A series of comparative polymerization reactions between propylene and divinylbenzene were carried out using magnesium dichloride/titanium tetrachloride/external donor/triethyl aluminum (MgCl$_2$/TiCl$_4$/ED/AlEt$_3$) as a catalyst system. In a typical Example (e.g., Example 34), 100 ml of hexane, 2.0 g of AlEt$_3$, and 40 mmol divinylbenzene were placed into a Parr 450 ml stainless autoclave equipped with a mechanical stirrer in an argon filled dry-box. The reactor was sealed and then moved out from the dry box and purged with propylene gas, and the reaction mass was saturated with 30 psi propylene gas at 50° C. About 55 mg (20.8 umol Ti) of MgCl$_2$/ED/TiCl$_4$ catalyst slurry in 5 ml of hexane was added under propylene pressure to initiate the polymerization. Additional propylene was fed continuously into the reactor to maintain a constant pressure of 30 psi during the entire course of the polymerization. After 60 min, the reaction was terminated by adding 100 ml of dilute HCl solution in methanol. The polymer was isolated by filtration and was washed completely with methanol and dried under vacuum for 8 hrs. About 6.41 g of propylene-co-divinylbenzene was obtained. Reaction conditions similar to those described for Example 34 were carried out for Examples 35–38.

In general, the MgCl$_2$/ED/TiCl$_4$/AlEt$_3$ catalyst system maintained good reactivity in the presence of divinylbenzene. As expected, divinylbenzene incorporation was very poor, and the mole ratio of vinyl/phenyl moieties (TSU/DOU) for each copolymer was near unity.

EXAMPLE 39

Lithiation and Silylation reactions of Poly(ethylene-ter-1-octene-ter-divinylbenzene)

In an argon filled dry box, 0.86 g of poly(ethylene-ter-1-octene-ter-divinylbenzene) containing 4.7 mole % of divinylbenzene units was dissolved in 100 ml of anhydrous cyclohexane in a 250 ml air-free flask equipped with a magnetic stirrer bar. Next, 0.75 mmol of s-butyl lithium (s-BuLi) solution and 0.75 mmol of tetramethylethylenediamine (TMEDA) were added into the flask, and the resulting solution was stirred at ambient temperature for 3 hours before adding 5 ml of trimethylsilane chloride (Me$_3$SiCl). After reacting for 1 hour at room temperature, the silylated polymer was isolated by precipitation in methanol. Repeated washing with methanol was performed before drying the resulting polymer under vacuum. $^1$H NMR spectrum shows no peak corresponding to a vinyl group and a strong peak at 0.05 ppm, corresponding to the methyl proton next to Si. Both metallation and silylation efficiencies were almost 100%.

EXAMPLE 40

Maleation Reaction of Poly(ethylene-ter-1-octene-ter-divinylbenzene)

In a 250 ml flask equipped with a stirrer and a condenser, 0.8 g of poly(ethylene-ter-1-octene-ter-divinylbenzene) containing 4.7 mole % of divinylbenzene was dissolved in 140 ml of xylene, along with 5 g of maleic anhydride and 0.1 g of free radical inhibitor. Under a nitrogen atmosphere, the solution was heated to 140° C. for 5 hours. A maleated polymer was isolated by precipitation in isopropanol. Repeated washing with isopropanol and acetone were performed before drying the resulting polymer under vacuum. IR spectrum analysis indicated a strong anhydride (C=O) absorption band with an intensity indicating 11.5 wt % maleic anhydride in the polymer.

EXAMPLES 41–44

Anionic Graft Reactions of Poly(ethylene-ter-1-octene-ter-divinylbenzene)

In a series of Examples, poly(ethylene-ter-1-octene-ter-divinylbenzene) containing 4.7 mole % of divinylbenzene was dissolved in 100 ml of anhydrous cyclohexane in a 250 ml flask equipped with a stirrer. A metallation reaction was performed by adding s-BuLi and tetramethylethylenediamine (TMEDA) to the solution. In each case, the resulting mixture was stirred at ambient temperature for 3 hours before adding styrene monomer. An anionic graft-from reaction was then carried out at ambient temperature for 1 hour before adding 10 ml of isopropanol to terminate the reaction. The precipitated polymers were filtered and then subjected to fractionation. The graft copolymer structures and compositions were determined by IR, $^1$H NMR, GPC and DSC studies. Overall, the graft-from reactions were very effective, with more than 80% monomer conversion within one hour. The graft content increased proportionally with increasing monomer concentration and reaction time. Since the graft-from reaction involves a living anionic polymerization, it is reasonable to assume that each benzylic lithium produces one polymer side chain and each side chain has a similar molecular weight. The graft density, defined as the number of grafted side chains per 1000 carbons in the polymer backbone, is the same as the density of benzylic anions. The side chain length is basically proportional to the reaction time and monomer concentration.

What is claimed is:

1. A linear, homogeneous copolymer comprising alpha-olefin and divinylbenzene comonomer units, and having the structural formula:

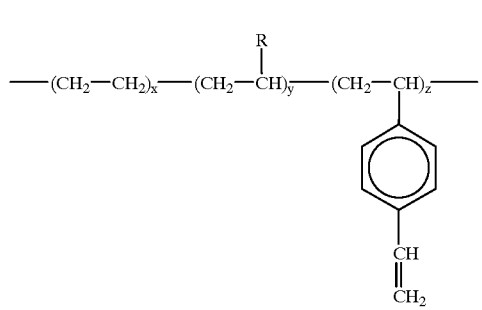

(I)

wherein R is a member selected from the group consisting of linear and branched alkyl groups and cyclic aliphatic and aromatic groups; x is the mole % of ethylene-derived units in the copolymer; y is the mole % of alpha-olefin-derived units in the copolymer, other than ethylene-derived units; x+y is the combined alpha-olefin mole % in the copolymer and is between about 50 and 99.9%; z is the mole % of units in the copolymer that are derived from divinylbenzene; and the sum of x+y+z is 100% ; said copolymer having a ratio of total unsaturation/divinylbenzene (TUS/DOU) between 0.8 and 1.1, a number average molecular weight (Mn) of at least 1,000, and a ratio of weight average molecular weight to number average molecular weight (Mw/Mn) of less than 4.

2. A linear copolymer according to claim 1, wherein the copolymer is a poly(ethylene-co-divinylbenzene), wherein y is 0, wherein x is at least 60%, and wherein the number average molecular weight of the copolymer is at least 10,000.

3. A linear copolymer according to claim 1, wherein the copolymer is a poly(propylene-co-divinylbenzene), wherein x is 0, wherein y is the mole % of propylene-derived units in the copolymer and is at least 60%, and wherein the number average molecular weight of the copolymer is at least 10,000.

4. A linear copolymer according to claim 1, wherein the copolymer is a poly(1-butene-co-divinylbenzene), wherein x is 0, wherein y is the mole % of 1-butene-derived units in the copolymer and is at least 60%, and wherein the number average molecular weight of the copolymer is at least 10,000.

5. A linear copolymer according to claim 1, wherein the copolymer is a poly(1-octene- co-divinylbenzene), wherein x is 0, wherein y is the mole % of 1-octene-derived units in the copolymer and is at least 60%, and wherein the number average molecular weight of the copolymer is at least 10,000.

6. A linear copolymer according to claim 1, wherein the copolymer is a poly(ethylene-ter-propylene-ter-divinylbenzene), wherein x is greater than 0, wherein y is the mole % of propylene-derived units in the copolymer and is greater than 0, wherein the sum of x+y is at least 60%, and wherein the number average molecular weight of the copolymer is at least 10,000.

7. A linear copolymer according to claim 1, wherein the copolymer is a poly(ethylene-ter-1-octene-ter-divinylbenzene), wherein x is greater than 0, wherein y is the mole % of 1-octene-derived units in the copolymer and is greater than 0, wherein the sum of x+y is at least 60%, and wherein the number average molecular weight of the copolymer is at least 10,000.

8. A process for preparing a linear, homogeneous copolymer comprising alpha-olefin and divinylbenzene comonomer units, and having the structural formula:

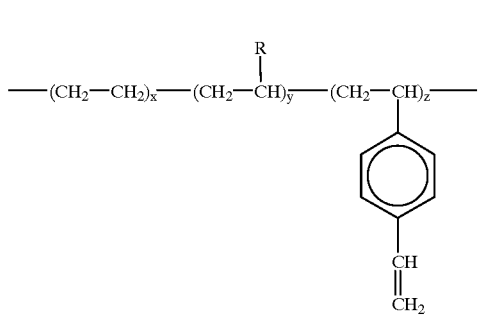

(I)

wherein R is a member selected from the group consisting of linear and branched alkyl groups and cyclic aliphatic and aromatic groups; x is the mole % of ethylene-derived units in the copolymer; y is the mole % of alpha-olefin-derived units in the copolymer, other than ethylene-derived units; x+y is the combined alpha-olefin mole % in the copolymer and is between about 50 and 99.9%; z is the mole % of units in the copolymer that are derived from divinylbenzene; and the sum of x+y+z is 100% ; and wherein said copolymer has a ratio of total unsaturation/divinylbenzene (TUS/DOU) between 0.8 and 1.1, a number average molecular weight (Mn) of at least 1,000, and a ratio of weight average molecular weight to number average molecular weight (Mw/Mn) of less than 4, which comprises:

contacting alpha-olefin monomer and divinylbenzene monomer under copolymerization reaction conditions and in the presence of a single site metallocene catalyst having substituted covalently-bridged ring ligands and having the structural formula:

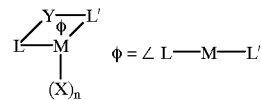

wherein M is a transition metal selected from group consisting of Group 3 and Group 4 metals of the Periodic Table of the Elements; wherein L and L', independently, are selected from —NR'—, —PR'—, cyclopentadienyl and substituted cyclopentadienyl groups bound in an $\eta^5$ bonding mode to said metal M; wherein at least one of L and L' is a cyclopentadienyl or substituted cyclopentadienyl group; wherein Y is a moiety selected from —SiR$_2$'—, —CR$_2$'—, and —CR$_2$'—CR$_2$'—; wherein R', independently, is selected from hydrogen, alkyl, aryl, silyl, halogeneated alkyl, halogenated aryl, and mixtures thereof; wherein X is selected from hydride, halo, alkyl, aryl, aryloxy, and alkoxy; wherein n is 0, 1 or 2; and wherein φ is the angle formed at the metal center between two L and L' ligands and is between 135 and 105°.

9. The process according to claim 8, wherein the alpha-olefin monomer and divinylbenzene monomer are contacted in the further presence of a cocatalyst for activating the single site metallocene catalyst.

10. The process according to claim 9, wherein M is selected from zirconium and titanium, and wherein said cocatalyst is a Bronsted acid salt with a noncoordinating anion.

11. The process according to claim 9, wherein the alpha-olefin monomer and divinylbenzene monomer are contacted in the presence of a reaction diluent selected from aliphatic and aromatic hydrocarbons.

12. The process according to claim 11, wherein said reaction diluent is selected from the group consisting of propane, butane, cyclopentane, hexane, toluene, heptane, isooctane and mixtures thereof.

13. The process according to claim 8, wherein said copolymer is formed as a slurry of particles in said reaction diluent.

14. The process according to claim 8, wherein said copolymer is soluble in said reaction diluent and wherein the process takes place as a homogeneous solution process.

* * * * *